(12) United States Patent
Lee et al.

(10) Patent No.: US 8,130,678 B2
(45) Date of Patent: Mar. 6, 2012

(54) AUTOMATIC FALL BEHIND WARNING METHOD AND SYSTEM

(75) Inventors: Kuen-Ming Lee, Tainan (TW);
Jenn-Lien Chu, Kaohsiung (TW);
Yu-Shiang Sheng, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 515 days.

(21) Appl. No.: 12/405,249

(22) Filed: Mar. 17, 2009

(65) Prior Publication Data
US 2010/0184425 A1 Jul. 22, 2010

(30) Foreign Application Priority Data
Jan. 19, 2009 (TW) .............................. 98101886 A

(51) Int. Cl.
*H04L 12/28* (2006.01)
*H04M 11/00* (2006.01)
*H04W 24/00* (2009.01)

(52) U.S. Cl. ...................... 370/255; 455/421; 455/456.1

(58) Field of Classification Search .................. 370/254, 370/255; 455/421, 456.1
See application file for complete search history.

(56) References Cited

U.S. PATENT DOCUMENTS

| 6,216,391 B1 | 4/2001 | Garrett, Jr. |
| 6,504,503 B1 | 1/2003 | Saint-Hilaire et al. |
| 6,832,153 B2 | 12/2004 | Thayer et al. |

OTHER PUBLICATIONS

"An Optimal Route & Vehicle Assignment Fleet Management System with Real-Time Monitoring", Fatima Batool, Huma Raheed,Malia Azim, Dr Shoab A.Khan, 0-7803-9421-6/05/$20.00 C2005 IEEE, p. 344.
"Sensor-based Training Optimization of a Cyclist Group", Ankang Le, Thomas Jaitner, Lothar Litz, 0-7695-2946-1/07 $25.00 © 2007 IEEE, p. 265-p. 270.
"Portable Wireless Battlefield Ministration Tracking and Information System", Jeremy Impson, Shirley Kupst, Dr. Nader Mehravari, Scott Rush, Steve Woods, 0-7803-5538-51991$10.00 Q 1999 IEEE, p. 1272-p. 1276.

*Primary Examiner* — Ronald Abelson

(57) ABSTRACT

Disclosed relates to an automatic fall behind warning method and system applied in a group activity environment. Each individual in the group corresponds to a node and all of such nodes form an independent network. The method initializes an outside node table for the group and gets a link quality index table (LQI table) among the nodes on the network. A table specifying outside and inside nodes for the network topology is generated via an algorithm. Then the method checks if there is a node being disappearing from the outside nodes of the generated table. If not, it updates the outside node table and continues to get a newest LQI table. If so, the node falls behind is confirmed and a warning notice is automatically generated once the disappearing node is not an inside node is verified. Otherwise, the method returns to the step of updating the outside node table.

18 Claims, 22 Drawing Sheets

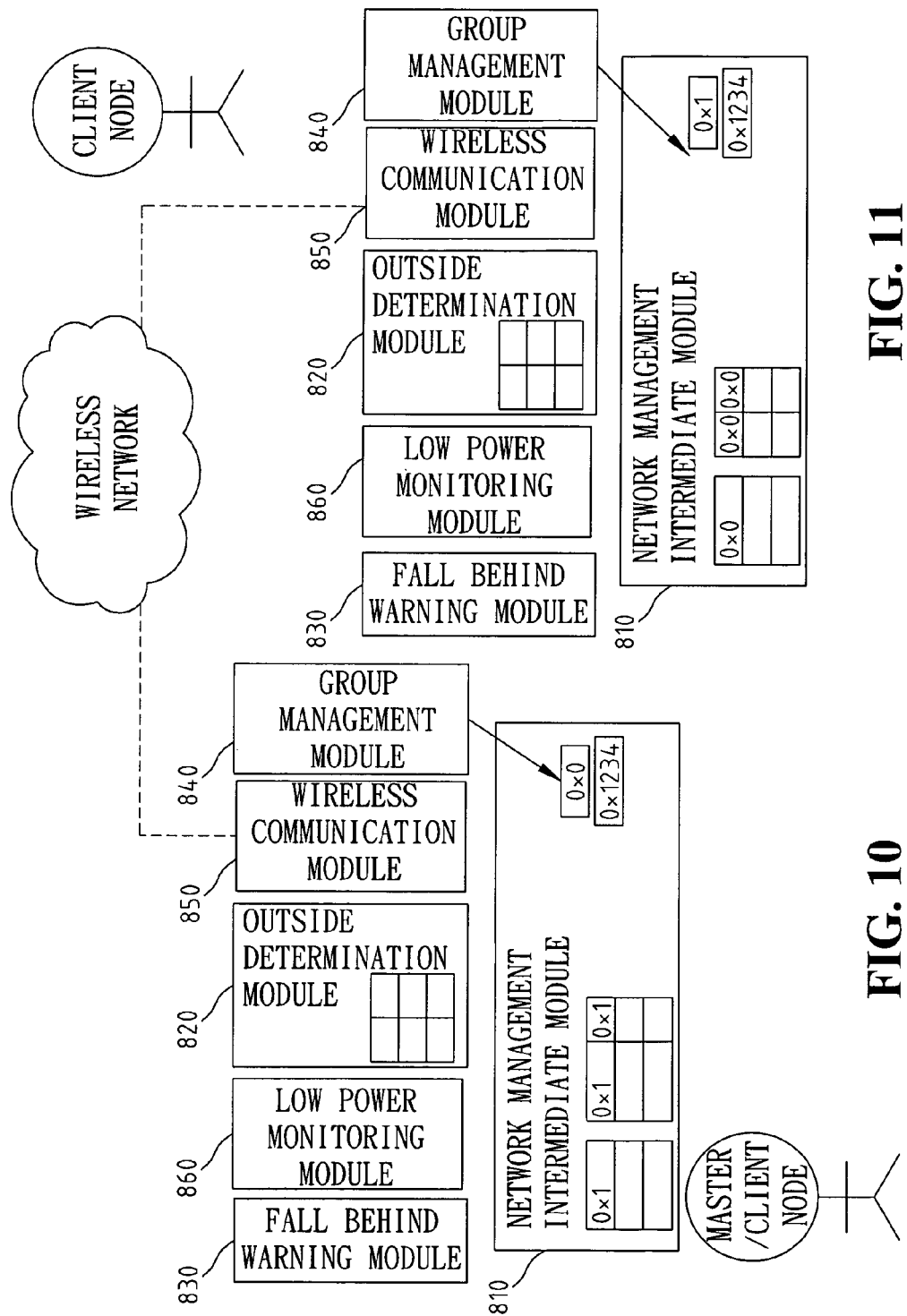

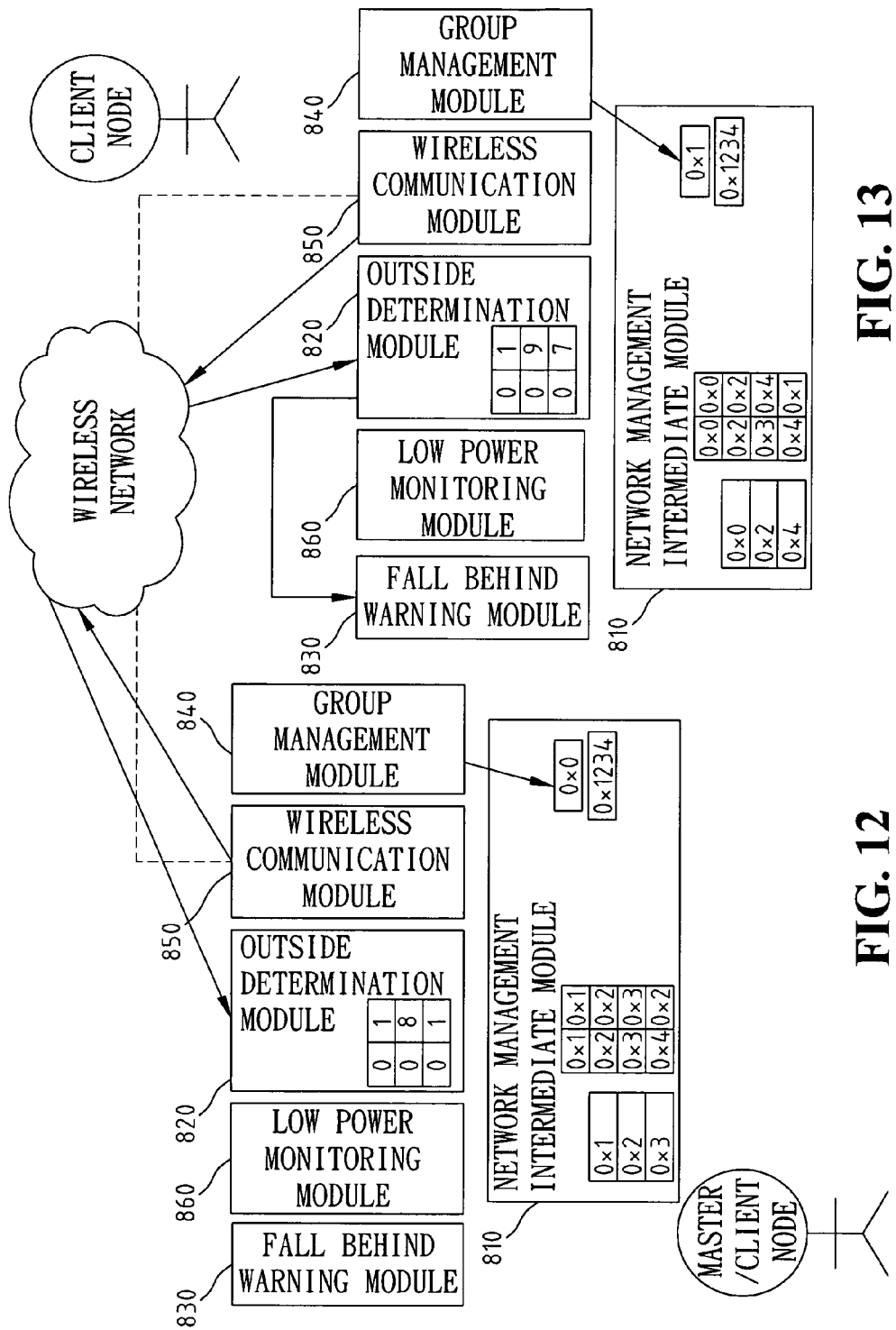

AUTOMATIC FALL BEHIND WARNING METHOD AND SYSTEM

FIELD OF THE INVENTION

The present invention generally relates to an automatic fall behind warning method and system, applicable to a group activity environment.

BACKGROUND OF THE INVENTION

The recent popularity of sports and leisure activities shows that more and more group activities, such as, hiking or bicycle-riding, are held. When people are involved in a group activity, a common problem is the fall behind of members of the group. A typical solution to the problem is to form a buddy system for mutual monitoring or confirm locations through the uses of radio walkie-talkie or mobile phones. As the kind of solution requires human intervene and lacks an automatic warning mechanism, accidents happen and urgent rescue operation is often delayed.

The existing fall behind warning technologies may be divided into three categories, as shown in FIG. 1. The first category is the manual fall behind warning technology, the second category is the semi-automatic fall behind warning technology and the third category is the automatic fall behind warning technology. In the first category, all the individuals of the group use either visual sighting or forming buddy system to monitor other members to prevent falling behind. In the second category, all the individuals of the group use wireless communication devices, such as walkie-talkie or mobile phone, to confirm the locations of one another to prevent falling behind. In the third category, all the individuals of the group use related positioning technology, such as global positioning system (GPS) or global system for mobile communication (GSM), to confirm the absolute location of one another to determine whether an individual is falling behind, and then use wireless communication technology, such as, RF or WiFi to automatically notify all the other individuals. The majority of the current technologies are in the second and the third categories.

The second category technologies, for example, include those disclosed by Ankang Le in IEEE "Sensor-based training optimization of a cyclist group" in 2007 and U.S. Pat. No. 6,832,153 "Method and Apparatus for Providing Pertaining to Vehicles Located Along a Predetermined Travel Route". In the disclosed IEEE paper, a plurality of bicycles performs mutual communication to know one another's location to optimize the cyclist group training. When a member cyclist falls behind, the problem is verified through the mutual communication of the members. The disclosed U.S. patent uses a pre-determined travel route to perform group management. The vehicles obtain the GPS information during traveling and send the feedback information to the information center. If a vehicle does not travel along the pre-determined travel route, a warning is automatically sent out and reports to the information center.

The third category technologies for example, include those disclosed by Fatima Batool et al. in IEEE "An optimal route & vehicle assignment fleet management system with real-time monitoring" in 2005 and Jeremy Impson et' al. in IEEE "Portable wireless battlefield ministration tracking and information system" in 1999.

Fatima Batool et. al. use the optimal route to manage the vehicle fleet. A vehicle obtains the real-time GPS information during traveling. If the vehicle does not follow the pre-determined route, a warning is automatically sent to the remote management center to achieve the automatic fall behind warning. Jeremy Impson et. al. use a system with personnel equipped with GPS device to report the GPS location of the personnel to the administrative center in real time. The system is applicable to the battlefield for monitoring the personnel, emergency reporting and fall behind warning.

Third category technologies, for example, also include those disclosed by U.S. Pat. No. 6,504,503 and U.S. Pat. No. 6,216,391. U.S. Pat. No. 6,504,503 disclosed a peer-to-peer GPS using a communication device with embedded GPS. Through peer-to-peer wireless communication, the communication device with embedded GPS may communicate the location information with others to prevent falling behind. U.S. Pat. No. 6,216,391 disclosed a method for locating a GSM mobile station, with the absolute location information from trigonometry algorithm using GSM mobile phone and GSM mobile station. The absolute location of the communication device may be obtained through the method and then the location information is exchanged through wireless communication to prevent falling behind.

As the human intervene is required in both the first category and the second category technologies for repeated confirmation or lack of automatic warning mechanism, accidents happen and urgent rescue operation is often delayed. The third category technologies usually require expensive communication devices and additional environment deployment, such as, GPS satellite and wireless station. Also, as the high power wireless communication technology is used, the high power consumption is only suitable for short-term activity.

SUMMARY OF THE INVENTION

The exemplary disclosed embodiments of the present invention may provide an automatic fall behind warning method and system.

In an exemplary embodiment, the disclosed relates to an automatic fall behind warning method, applicable to a group activity environment. Each individual in the group corresponds to a node and all of such nodes form an independent network. The method may comprise: initializing an outside node table for the group and getting a link quality index table (LQI table) among the nodes on the network; generating a table specifying outside and inside nodes for the network topology via an outside determination algorithm; checking if there is a node being disappearing from the outside nodes of the generated table; If not, updating the outside node table and continuing to get a newest LQI table; and if so, checking if the node falls behind is an inside node, and automatically generating a warning notice once the disappearing node is not an inside node is verified, otherwise, returning to the step of updating the outside node table if all the connections are not examined.

In another exemplary embodiment, the disclosed relates to an automatic fall behind warning system, comprising a plurality of wireless communication devices, applicable to a group activity environment. Each wireless communication device in the group corresponds to a node and all of such nodes form an independent network. Each wireless communication device may comprise: a network management intermediate module for managing the network related information of each node; an outside determination module for monitoring the signal strength of the neighboring nodes of each node and generating an outside node table for the network topology; a fall behind warning module for comparing the outside node table, determining whether a fall behind event occurring, and automatically sending a warning if so; a group management module for activating the network management intermediate module and managing the network setting of each node; and a wireless communication module for activating a wireless network to perform the wireless communication among nodes.

The foregoing and other features, aspects and advantages of the present invention will become better understood from a careful reading of a detailed description provided herein below with appropriate reference to the accompanying drawings.

BRIEF DESCRIPTION OF THE DRAWINGS

FIG. 10 shows an exemplary schematic view illustrating a network management intermediate module of a communication device carried by a master node in a Mesh network formed by all the nodes, consistent with certain disclosed embodiments of the present invention.

FIG. 11 shows an exemplary schematic view illustrating a network management intermediate module of a communication device carried by a client node in a Mesh network formed by all the nodes, consistent with certain disclosed embodiments of the present invention.

FIG. 12 shows an exemplary schematic view of updating one hop table and a routing table of the network management intermediate module and a LQI table of the outside determination module of FIG. 10, consistent with certain disclosed embodiments of the present invention.

FIG. 13 shows an exemplary schematic view of updating one hop table and a routing table of the network management intermediate module and a LQI table of the outside determination module of FIG. 11, consistent with certain disclosed embodiments of the present invention.

DETAILED DESCRIPTION OF THE PREFERRED EMBODIMENTS

The present invention uses wireless communication signal for determining network topology and signal transmission mechanism, and continuously monitors the individuals of the outside activity to determine whether a fall behind event has occurred. The disclosed embodiments of the present invention may provide an automatic fall behind warning method and system, applicable to a group activity environment to solve the fall behind warning problem of group activities. The following defines related terminologies, such as group, group activity environment, fall behind, connectivity, and so on.

A group indicates that at least two individuals are included. The group activity environment means any communication device of an individual of the group is able to communicate with at least a communication device of another individual of the group. Fall behind means that at least two individuals of the group that have been in connection are unable to connect, which is defined as a fall behind event. Connectivity means the capability of connecting to the network formed by the group.

Figure 1:
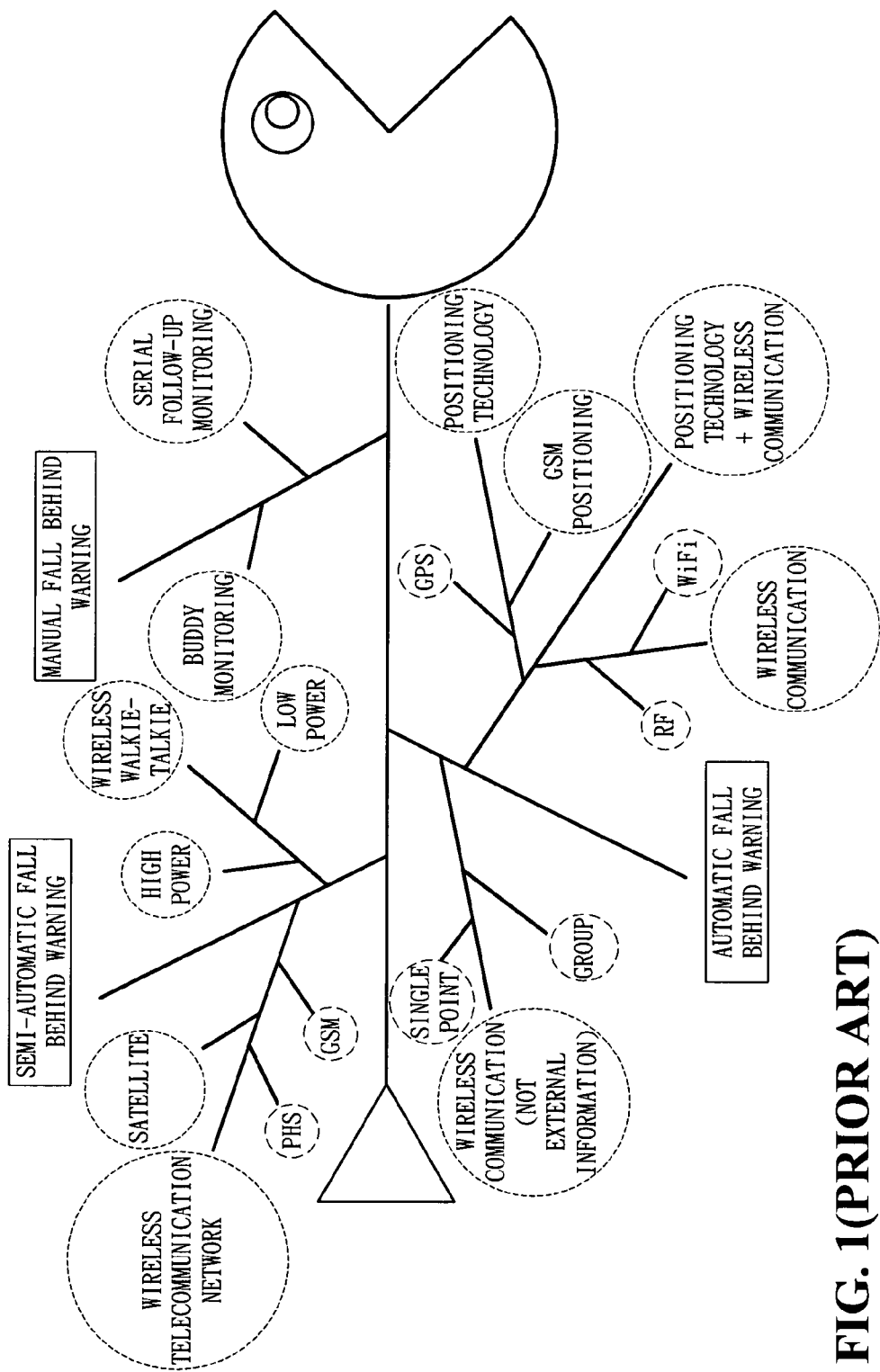
FIG. 1 shows an exemplary schematic view of the fishbone diagram illustrating fall behind warning technology.
Figure 2:
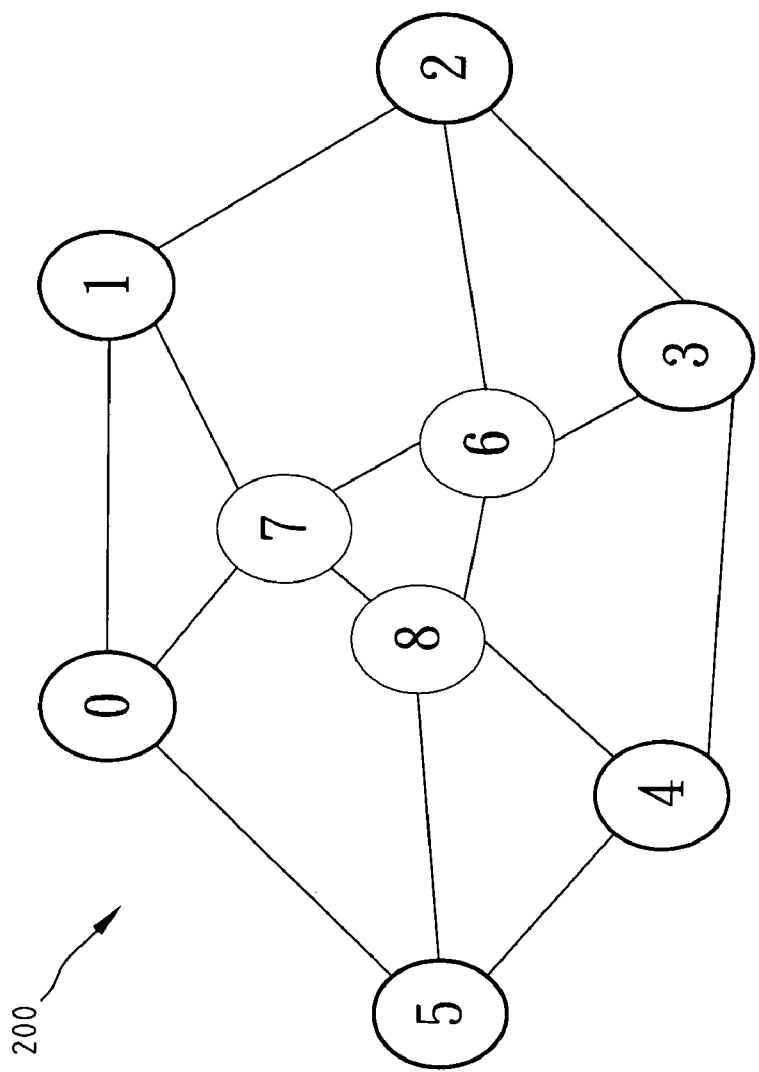
FIG. 2 shows an exemplary schematic view illustrating the location relationship of the network topology of a fall behind individual, consistent with certain disclosed embodiments of the present invention.

The disclosed embodiments analyze the location relationships and network topology for the fall-behind individuals and explore the characteristic that only individuals on the outskirt part of the group activity, called outside, have the possibility to fall behind. Accordingly, the disclosed embodiments of the present invention continuously monitor the individuals on the outside of the group to determine whether a fall behind event has occurred. FIG. 2 shows an exemplary schematic view illustrating the location relationship of the network topology of a fall behind individual, consistent with certain disclosed embodiments of the present invention. As shown in FIG. 2, network topology 200 includes 9 individuals, and with individual 0, 1, 2, 3, 4, 5 as possible fall-behind candidates while individuals 6, 7, 8 as impossible to fall behind. In other words, only individuals on the outside of the group, i.e., individuals 0, 1, 2, 3, 4, 5, have the possibility to fall behind. Hence, the disclosed embodiments of the present invention also disclose an outside determination algorithm to determine the individuals on the outside part of the group. The outside determination algorithm will be described in details later.

Figure 3:
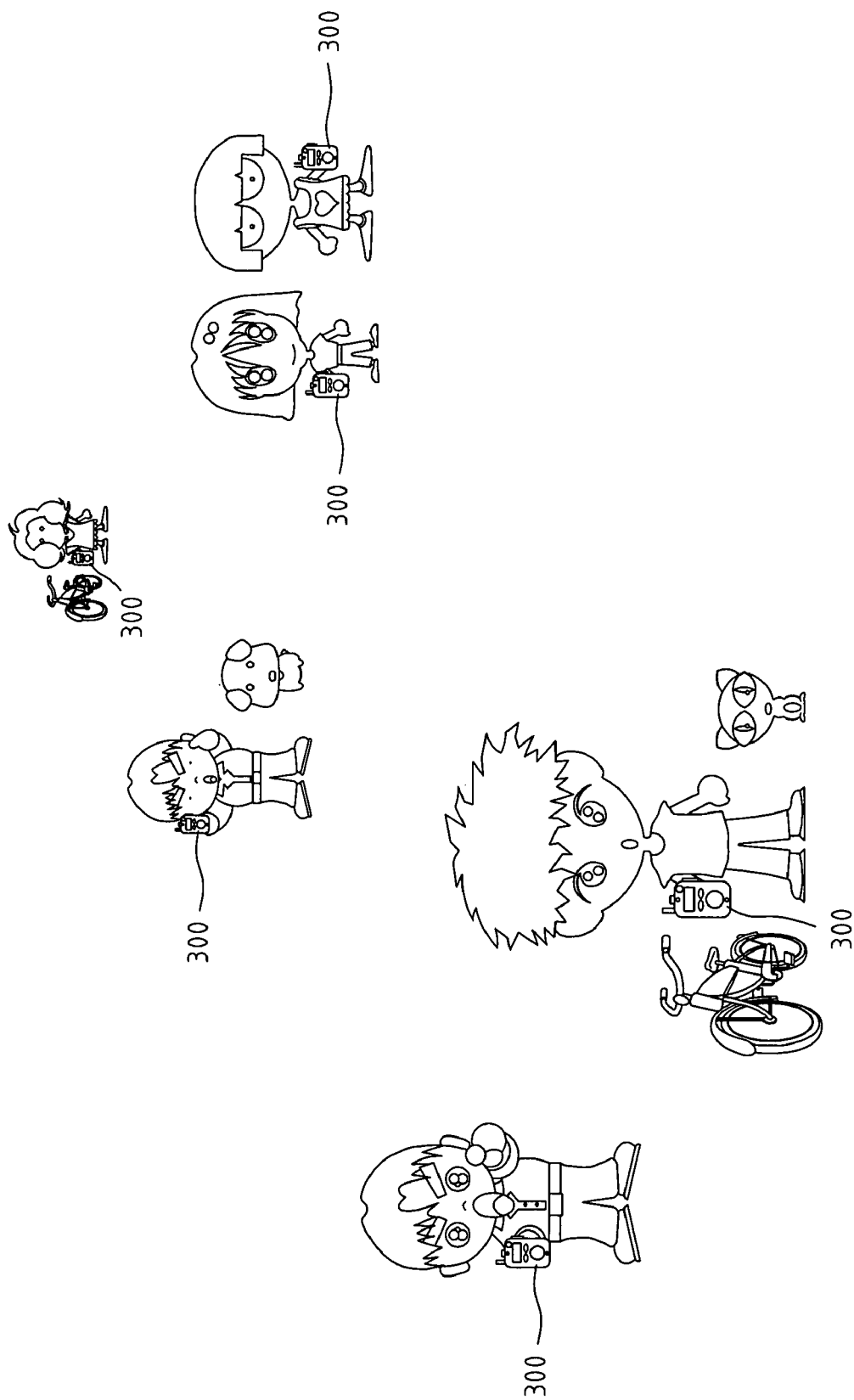
FIG. 3 shows an exemplary system topology of the automatic fall behind warning system applied to an actual group activity environment, consistent with certain disclosed embodiments of the present invention.

The present invention is applicable to a group activity environment. FIG. 3 shows an exemplary system topology of the automatic fall behind warning system applied to an actual group activity environment, consistent with certain disclosed embodiments of the present invention. As shown in the system topology of FIG. 3, the group activity environment is where the individuals are scattered within the group and each individual is equipped with a fall behind warning system 300 of the present invention.

In the disclosed embodiment, the network topology for the system is described with the area covered by the wireless signal of the communication device of fall behind warning system 300 carried by the individuals of the group. In addition, any communication device carried by the individuals of the group is able to communicate with at least a communication device carried by another individual of the group, and uses wireless communication signal to execute the network topology determination and message transmission. The communication device carried by each individual of the group corresponds to a node and all the nodes use a standard communication protocol, such as, ZigBee, to form an independent network.

The disclosed embodiments of the present invention accomplishes the automatic fall behind warning mechanism by collecting the link quality index (LQI) list among the nodes of the entire network, obtaining the inside and outside node tables of the current network topology, and continuously monitoring the individuals on the outside of the group. That is, when a fall behind event occurs, a warning message is sent to all the other individuals of the group automatically. In this manner, the accidents or the delay of rescue may be prevented. The LQI list may be obtained by the topology information of the entire network.

Figure 4:
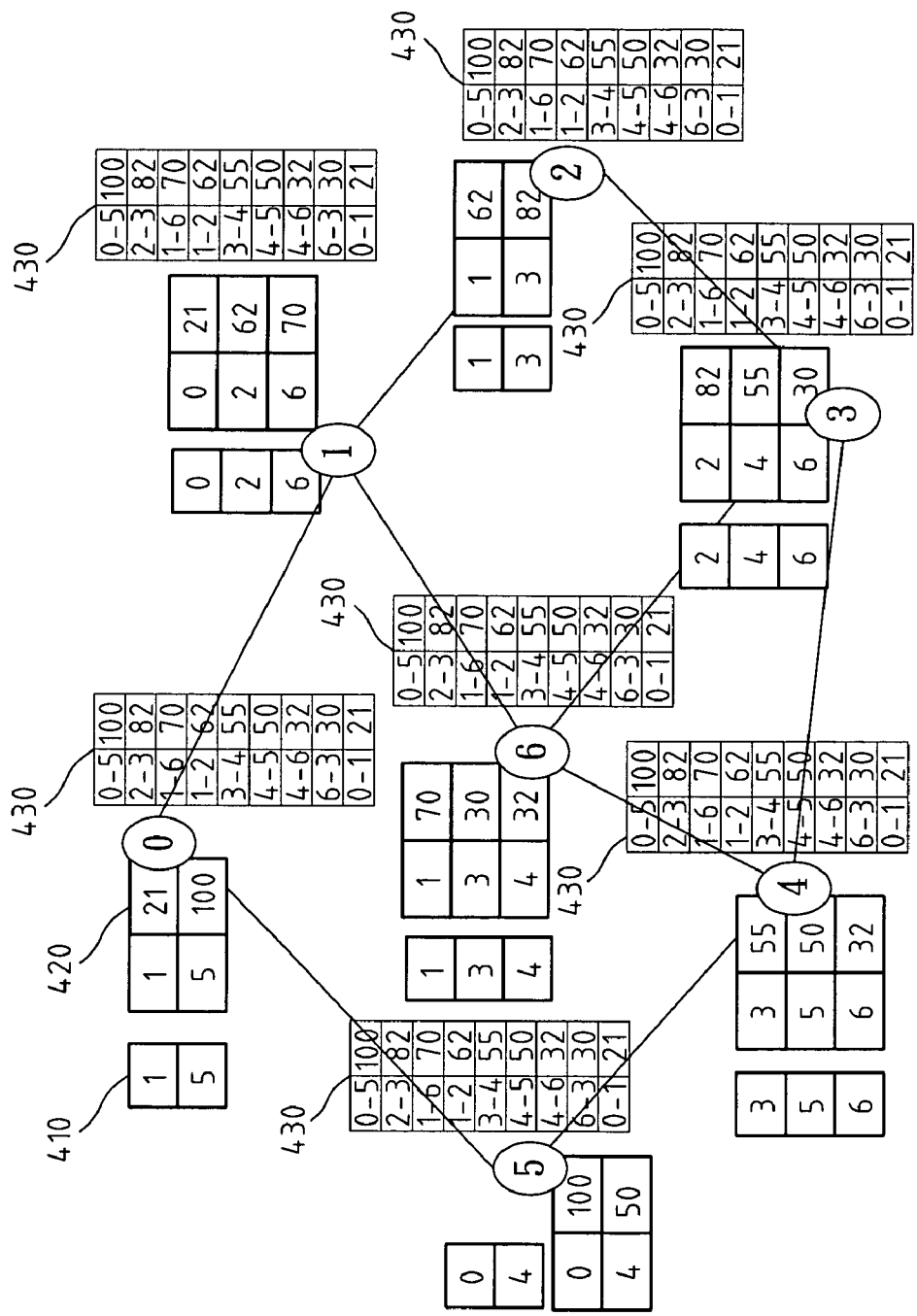
FIG. 4 shows an example illustrating the network topology information among nodes of a Mesh network architecture, consistent with certain disclosed embodiments of the present invention.

FIG. 4 shows an example illustrating the network topology information among nodes of a Mesh network architecture, consistent with certain disclosed embodiments of the present invention. As shown in FIG. 4, the network architecture includes seven nodes, i.e., nodes 0, 1, 2, 3, 4, 5, 6. The seven nodes form a network topology having 9 connections, i.e., 0-5, 2-3, 1-6, 1-2, 3-4, 4-5, 4-6, 6-3, 0-1. Each node corresponds to three tables, including one hop table, signal strength table and LQI table. Take node 0 as an example. One hop table 410 includes node 1 and node 5 neighboring node 0. Signal strength table 420 includes signal strength 21 and 100 corresponding to neighboring node 1 and neighboring node 5, respectively. LQI table 430 includes the connection among the nodes and corresponding signal strength of each connection. In this example, the entries are ordered by signal strength, for example, connection 0-5 having the strongest signal strength 100, connection 2-3 having the next strongest signal strength 82, and so on, until, connection 0-1 having the signal strength 21.

Figure 5:
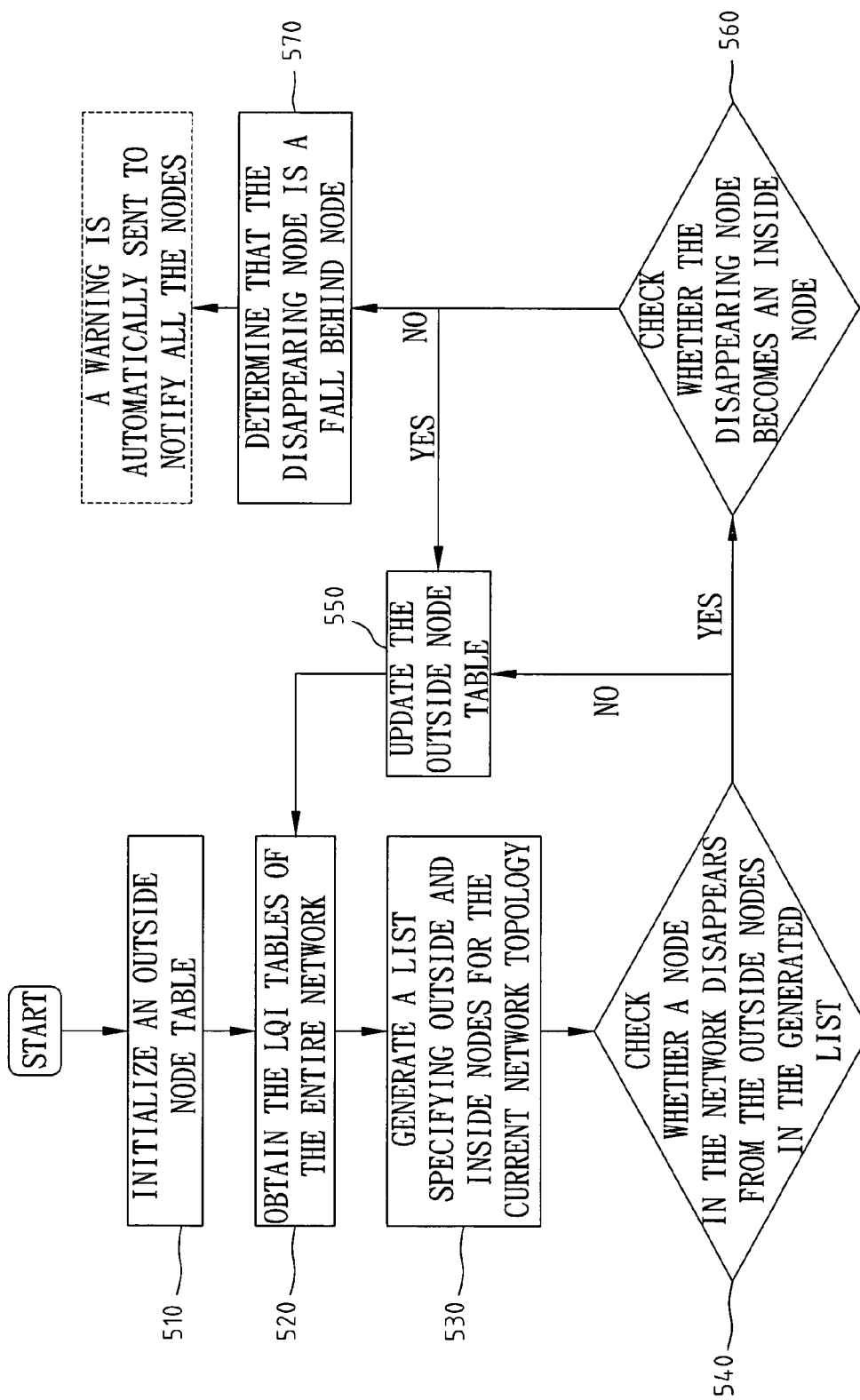
FIG. 5 shows an exemplary flowchart illustrating the operation of an automatic fall behind warning method, consistent with certain disclosed embodiments of the present invention.

FIG. 5 shows an exemplary flowchart illustrating the operation of an automatic fall behind warning method, consistent with certain disclosed embodiments of the present invention. Referring to FIG. 5, an outside node table is initialized (step 510), and the LQI table among the nodes for the entire network is obtained (step 520). In step 530, a list specifying outside and inside nodes for the current network topology via the outside determination algorithm may be generated. It is then to check whether a node in the network disappears from the outside nodes in the generated list (step 540). If not, the following step is to update the outside node table (step 550) and then return to step 520; otherwise, it may check whether the disappearing node becomes an inside node (step 560). If the disappearing node is not an inside node, then it may determine that the disappearing node is a fall behind node (step 570) and a warning is automatically sent to notify all the other nodes; otherwise, return to step 550.

Figure 6:
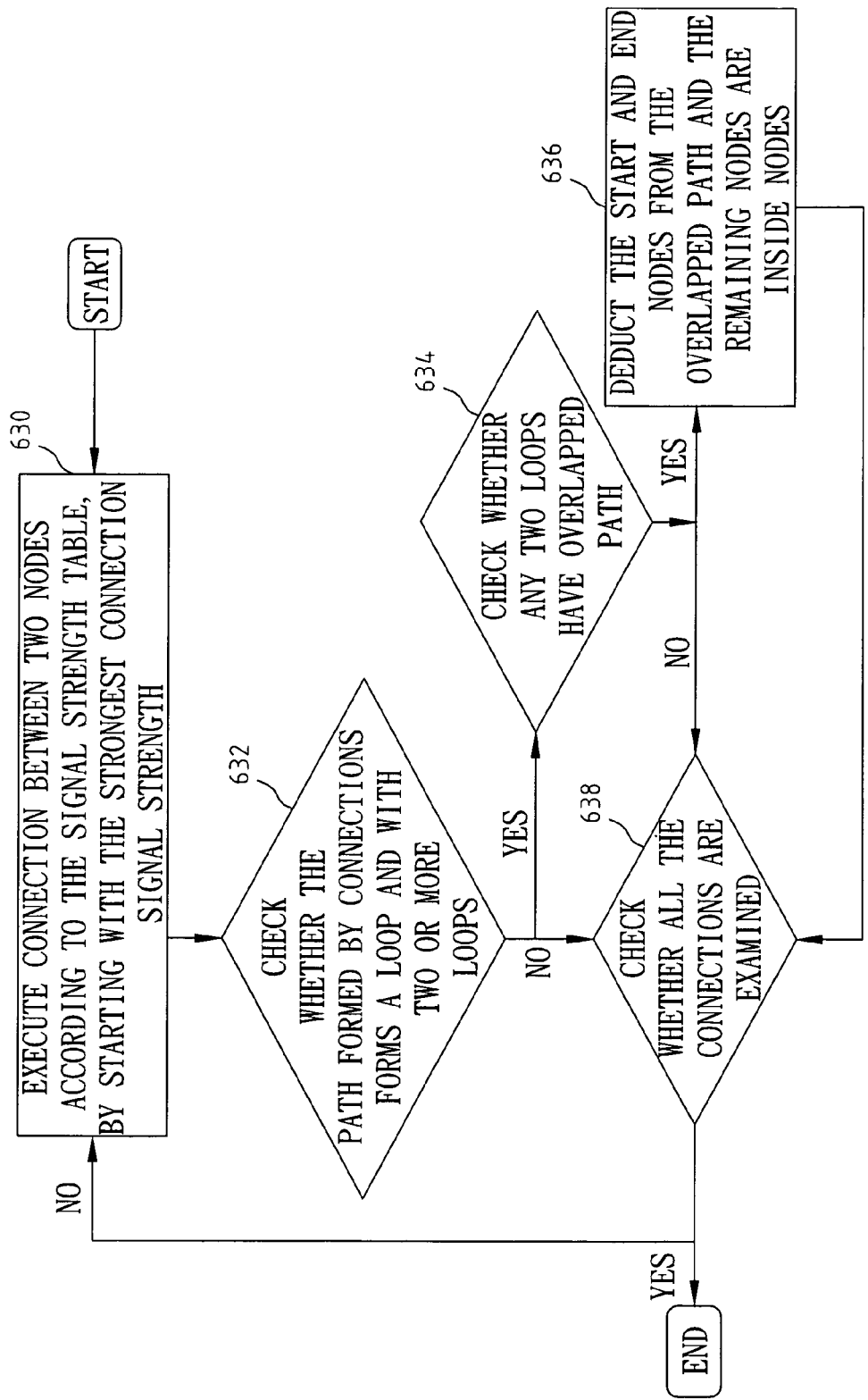
FIG. 6 shows an exemplary flowchart of an outside determination algorithm, consistent with certain disclosed embodiments of the present invention.

The following describes the outside determination algorithm and uses the network topology formed by the seven nodes of FIG. 4 as an exemplar to explain the operation of the algorithm. FIG. 6 shows an exemplary flowchart of an outside determination algorithm, consistent with certain disclosed embodiments of the present invention. As shown in FIG. 6, the connection between two nodes is executed according to the signal strength table, by starting with the strongest connection signal strength (step 630). Then, it is to check whether the path formed by connections forms a loop and with more than two loops (step 632). If so, it is to further check whether any two loops have overlapped path (step 634); otherwise, it may check whether all the connections are examined (step 638).

After step 634, if there are two loops having overlapped path, the start and end nodes are deducted from the overlapped path and the remaining nodes are inside nodes (step 636); then return to step 638. After step 638, if all the connections are checked, the algorithm is terminated; otherwise, return to step 630.

Figure 7A:
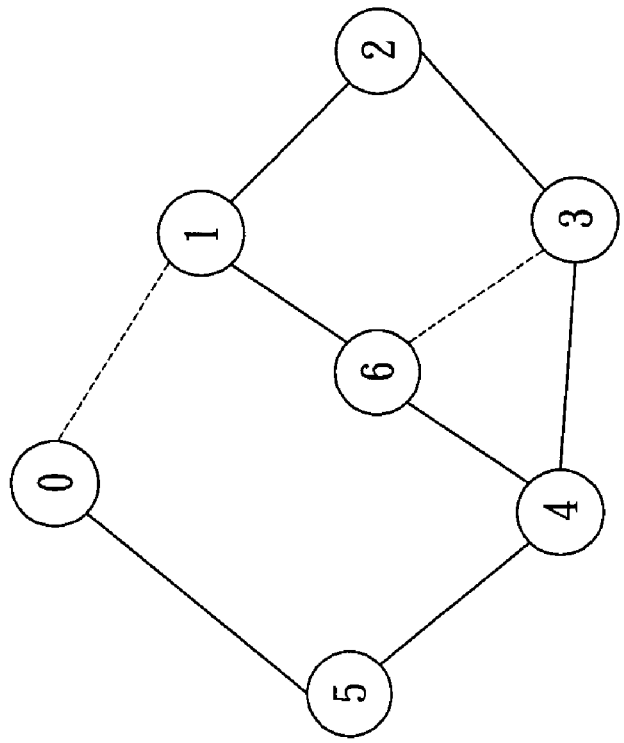
FIGS. 7A-7I show the step sequence illustrating the outside determination algorithm by taking the topology of FIG. 4 as an example, consistent with certain disclosed embodiments of the present invention.
Figure 7B:
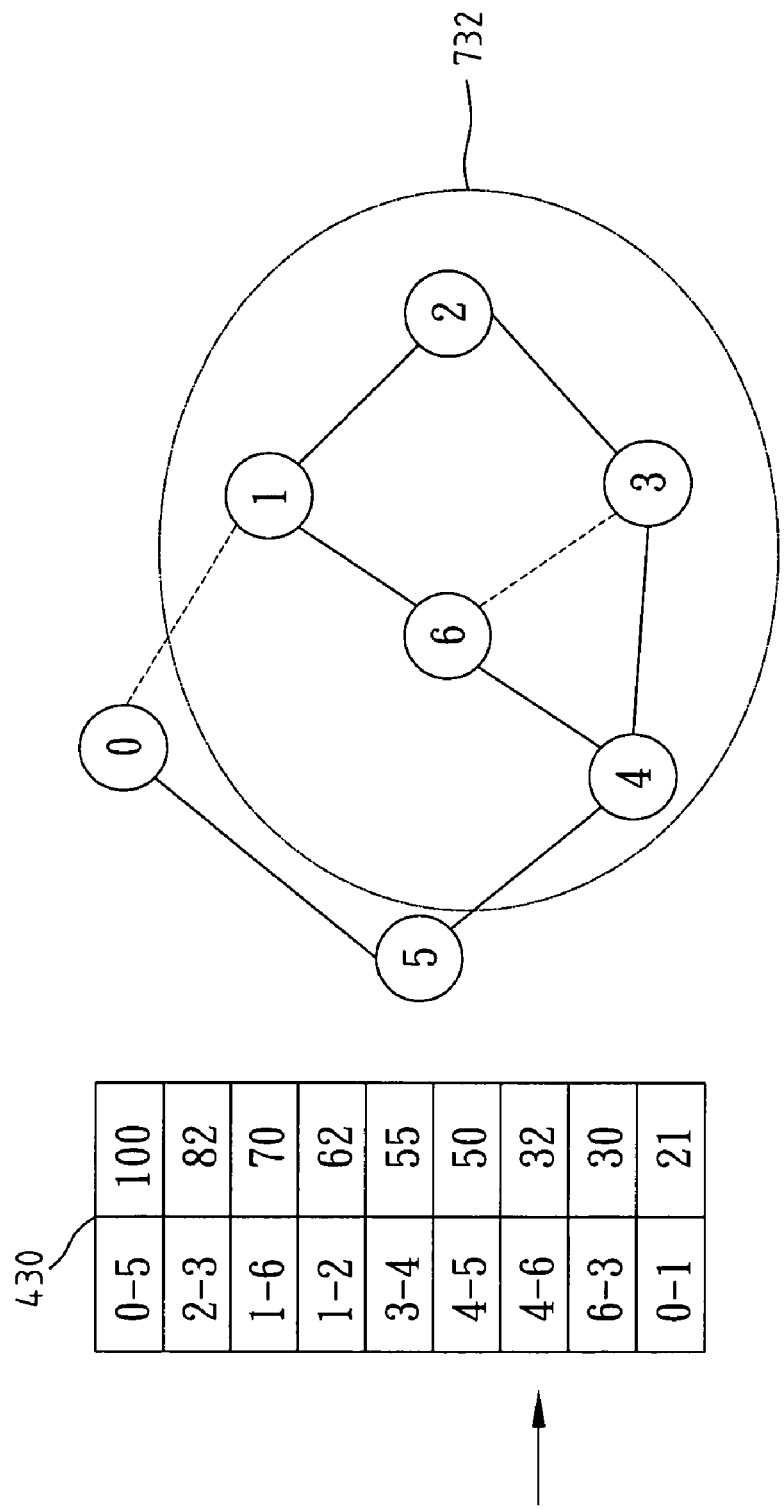
Figure 7C:
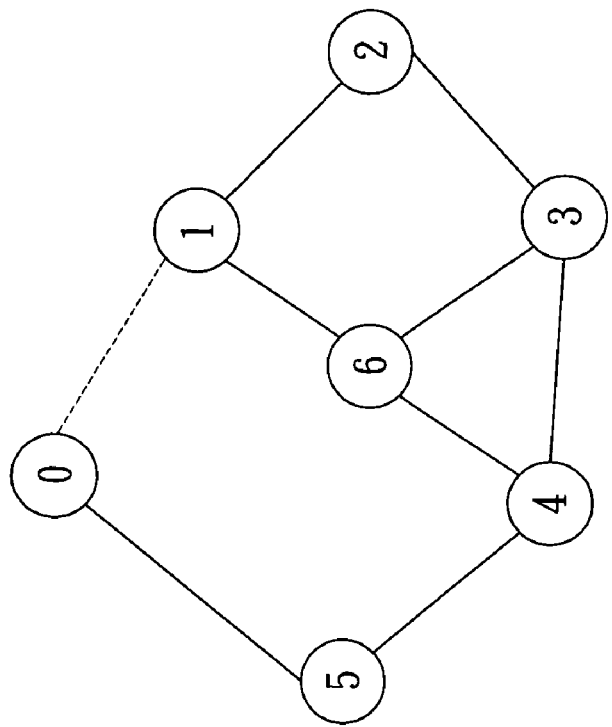
Figure 7D:
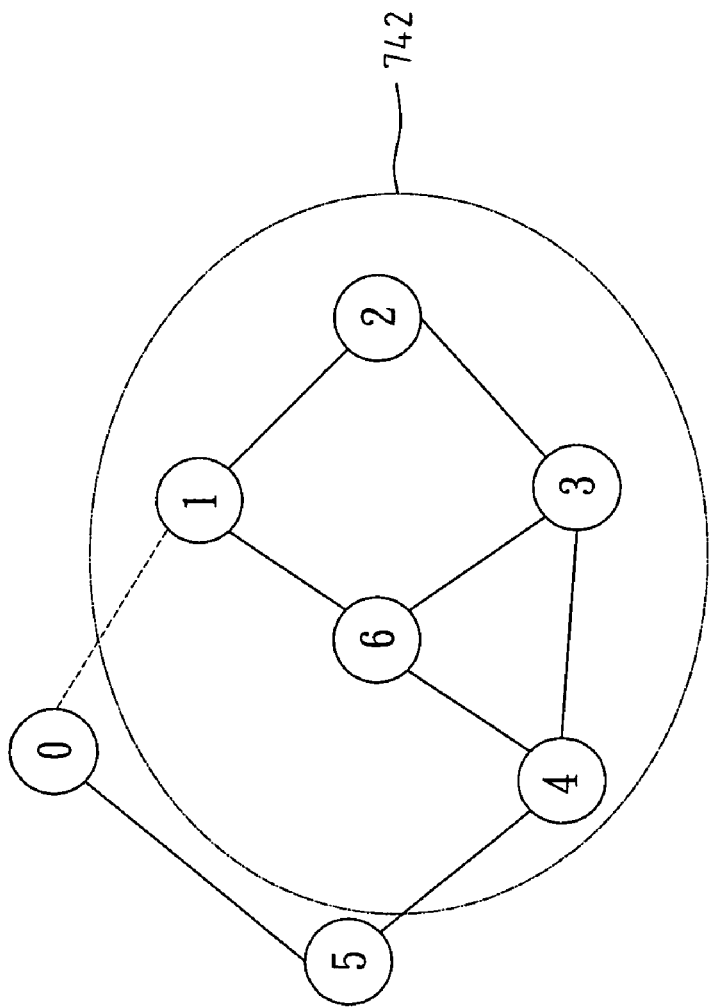
Figure 7E:
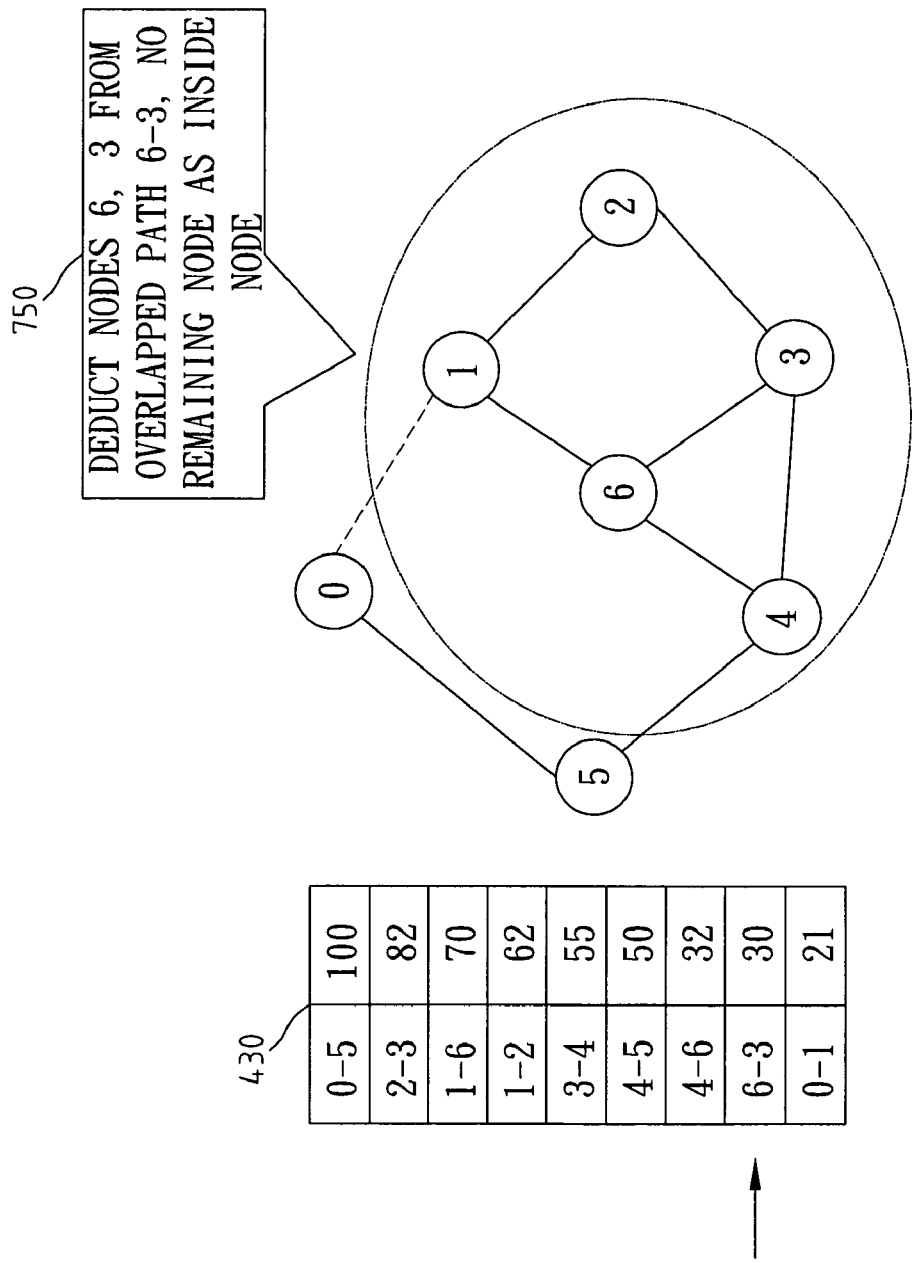
Figure 7F:
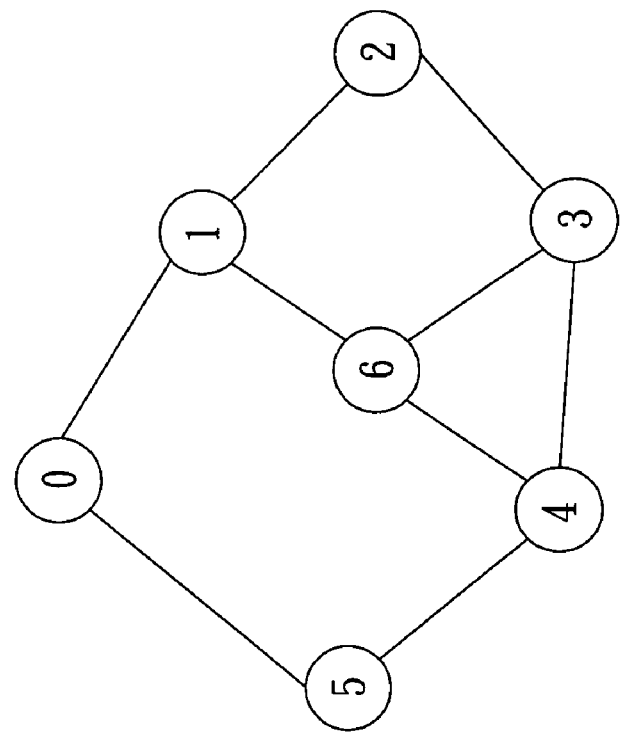
Figure 7G:
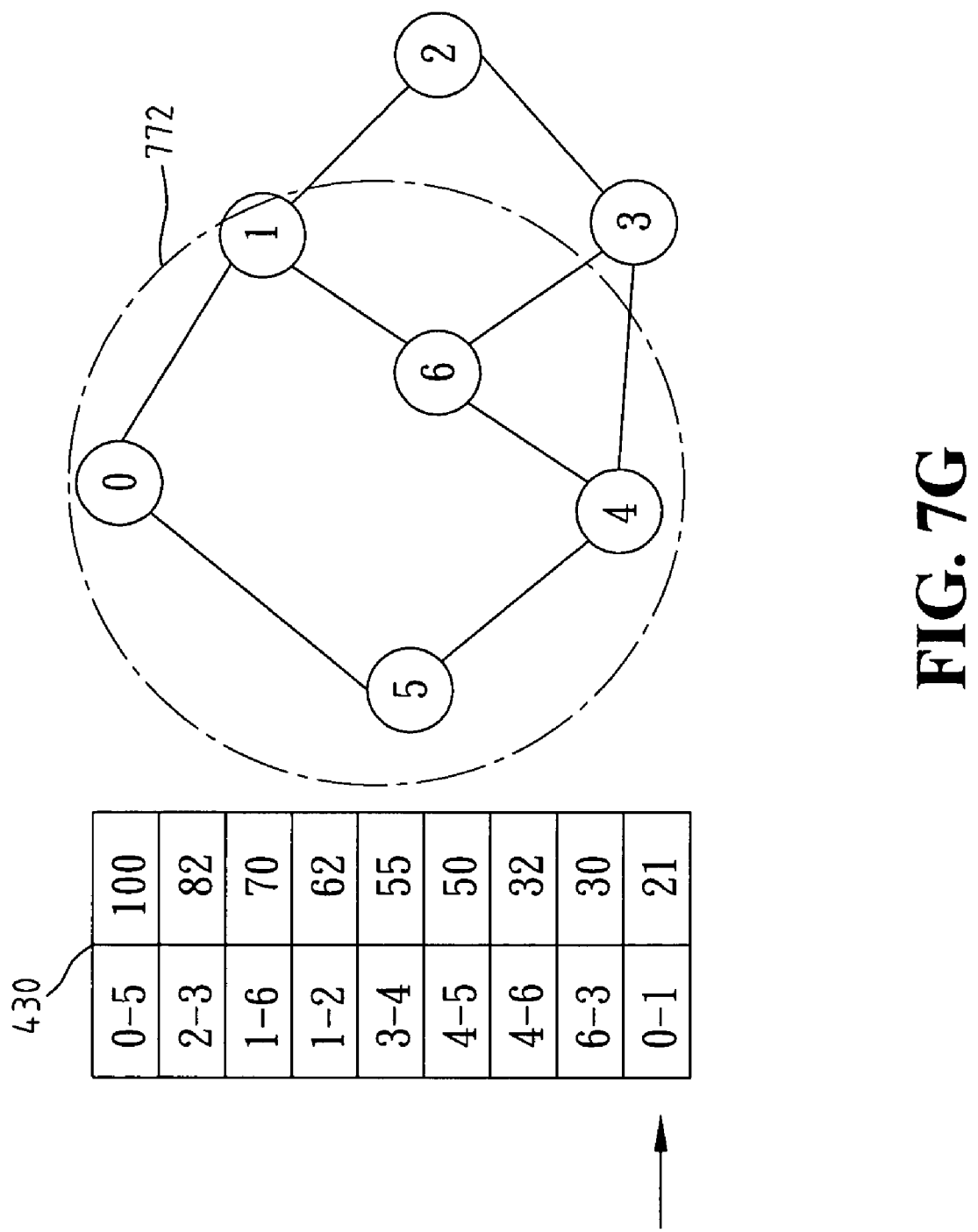
Figure 7H:
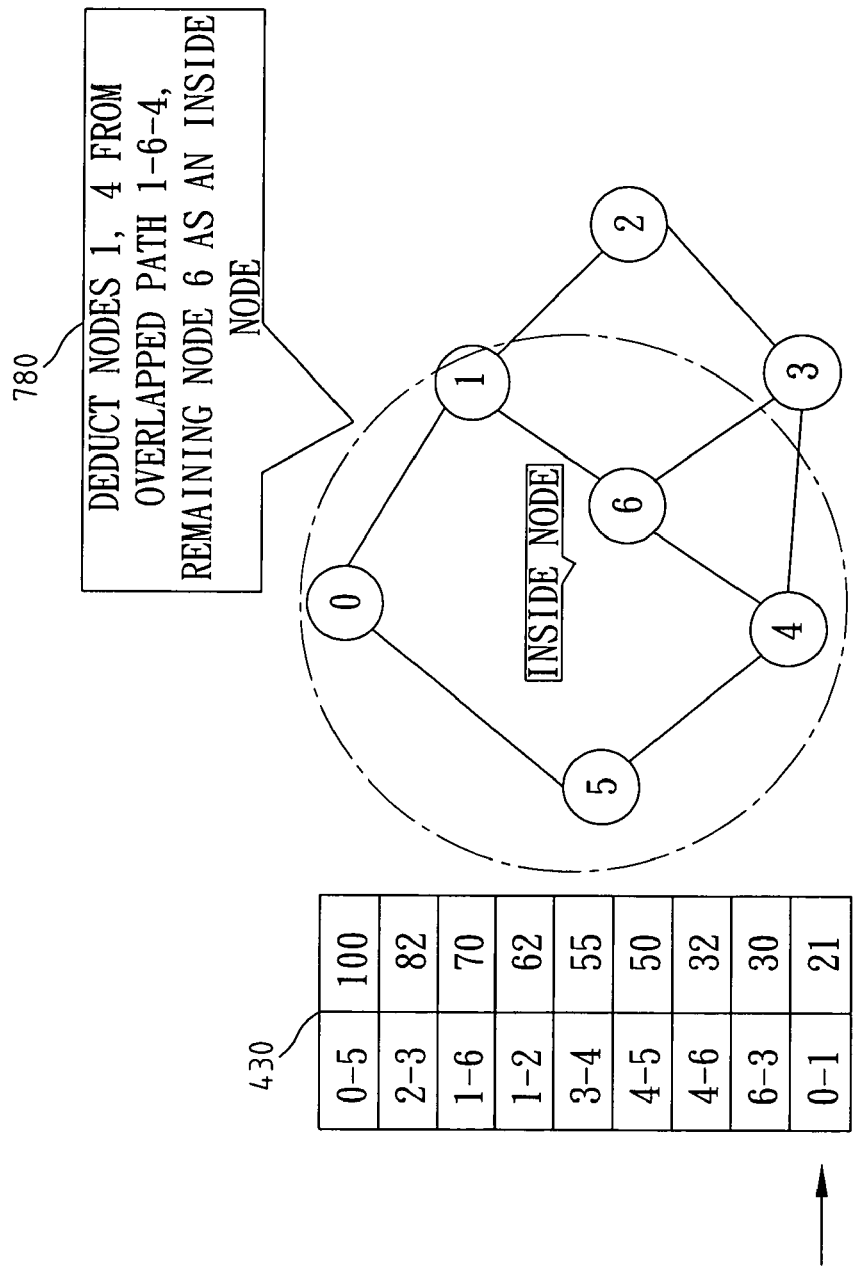
Figure 7I:
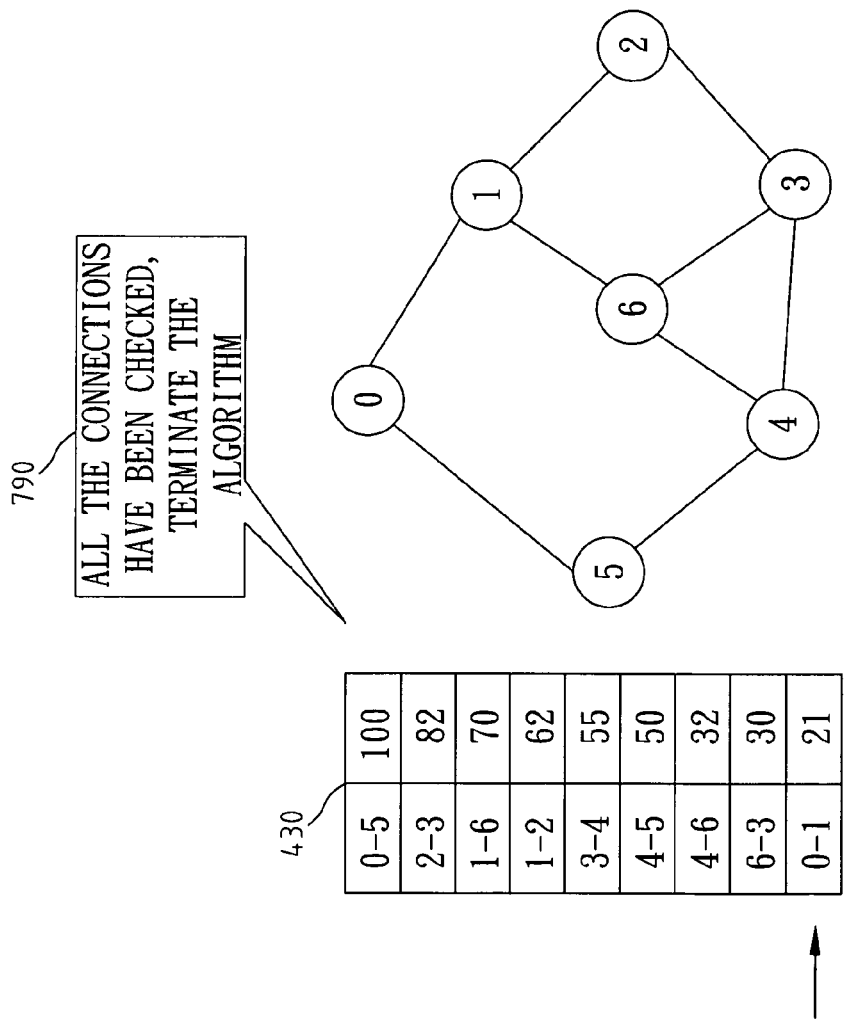

FIGS. 7A-7I show the step sequence illustrating the outside determination algorithm by taking the topology of FIG. 4 as an example, consistent with certain disclosed embodiments of the present invention. In FIG. 7A, step 630 is executed. According to the LQI table, the connection between 0-5, 2-3, 1-6, 1-2, 3-4, 4-5, 4-6 are performed according to the signal strength order, and the solid line is used to indicate the connection. In FIG. 7B, step 632 is executed and a loop is found, labeled as 732. As there is only one loop, and not all the connections are examined, thus the algorithm continues (i.e. return to step 630). In FIG. 7C, step 630 is executed. The connection 6-3 is performed according to the signal strength, and a solid line is used to indicate the connection. In FIG. 7D, steps 632 and 634 are executed, and two loops with overlapped path 6-3 (labeled as 742) are found. In FIG. 7E, step 638 is executed. Start node 6 and end node 3 are deducted from overlapped path 6-3 and no remaining node becomes an inside node, labeled as 750. In FIG. 7F, step 630 is executed. The connection 0-1 is performed according to the signal strength. In FIG. 7G, step 632 and step 634 are executed, and two loops with overlapped path 1-6-4 (labeled as 772) are found. In FIG. 7H, step 636 is executed. Start node 1 and end node 4 are deducted from overlapped path 1-6-4 and remaining node 6 becomes an inside node, labeled as 780. In FIG. 7I, step 638 is executed. All the connections have been checked and it may terminate the execution of the algorithm, labeled as 790.

In other words, according to the execution result of the above outside determination algorithm, node 6 is an inside node and nodes 0, 1, 2, 3, 4, 5 are outside nodes.

The above description shows that the automatic fall behind warning method of the present invention does not require additional information, such as, the relative location information of two nodes in the network. The present invention may use wireless communication signal to determine the network topology and for message transmission.

Referring back to the exemplary system topology of the fall behind warning system of the present invention applied to an actual group activity in FIG. 3, each group member is equipped with a fall behind warning system 300 of the present invention. In other words, fall behind warning system 300 of the present invention is applied to a group activity environment, including a plurality of wireless communication devices, where each wireless communication device may be described with the exemplary structure of FIG. 8, consistent with certain disclosed embodiments of the present invention.

Figure 8:
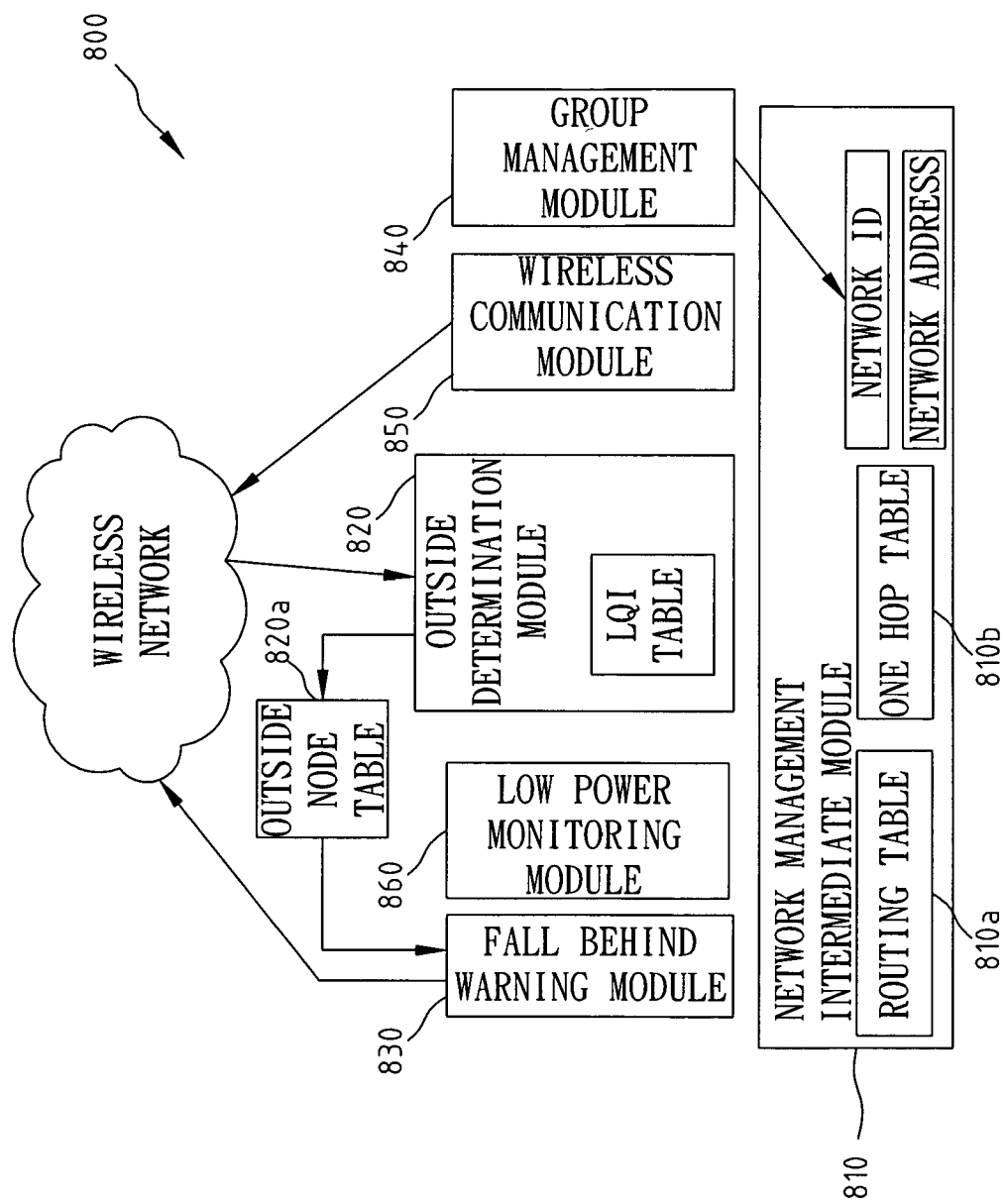
FIG. 8 shows a schematic view illustrating an exemplary wireless communication device of the automatic fall behind warning system, consistent with certain disclosed embodiments of the present invention.

Referring to FIG. 8, wireless communication device 800 may include a network management intermediate module 810, an outside determination module 820, a fall behind warning module 830, a group management module 840, and a wireless communication module 850. Network management intermediate module 810 manages the network related information of each node, such as initializing network, adding to network, allocating network address and managing one hop table and routing table. Outside determination module 820 monitors the signal strength of the one hop table of each node and generates an outside node table 820a for the network topology. The network topology is formed by all the nodes and the related information, and the exemplary related information of the network topology is as shown in FIG. 4.

Outside determination module 820 may further includes a link quality index (LQI) table for storing the link quality information with the neighboring nodes, such as the signal strength of the neighboring nodes.

Fall behind warning module 830 compares outside node table 820a, determines whether a fall behind event occurring and automatically sends a warning to notify all the other individuals of the group if so. Group management module 840 activates network management intermediate module 810 and manages the network setting of each node through network management intermediate module 810.

Wireless communication module 850 activates a wireless network to perform the wireless communication among nodes, such as having all the nodes periodically broadcast still alive packets to other nodes.

Wireless communication device 800 may further includes a low power monitoring module 860 for monitoring the power condition of the device and sending a warning when the power is below a threshold.

In network management intermediate module 810, a one hop table 810b may be used to record the information of each neighboring node and a routing table 810a may be used to record the routing information of the communication protocol. Also, two fields, i.e., network ID and network address, are used to record the specific network and the assigned network address of the individual of the group. Fall behind warning module 830 may use the LQI table to record the latest signal strength between the node pairs.

Figure 9:
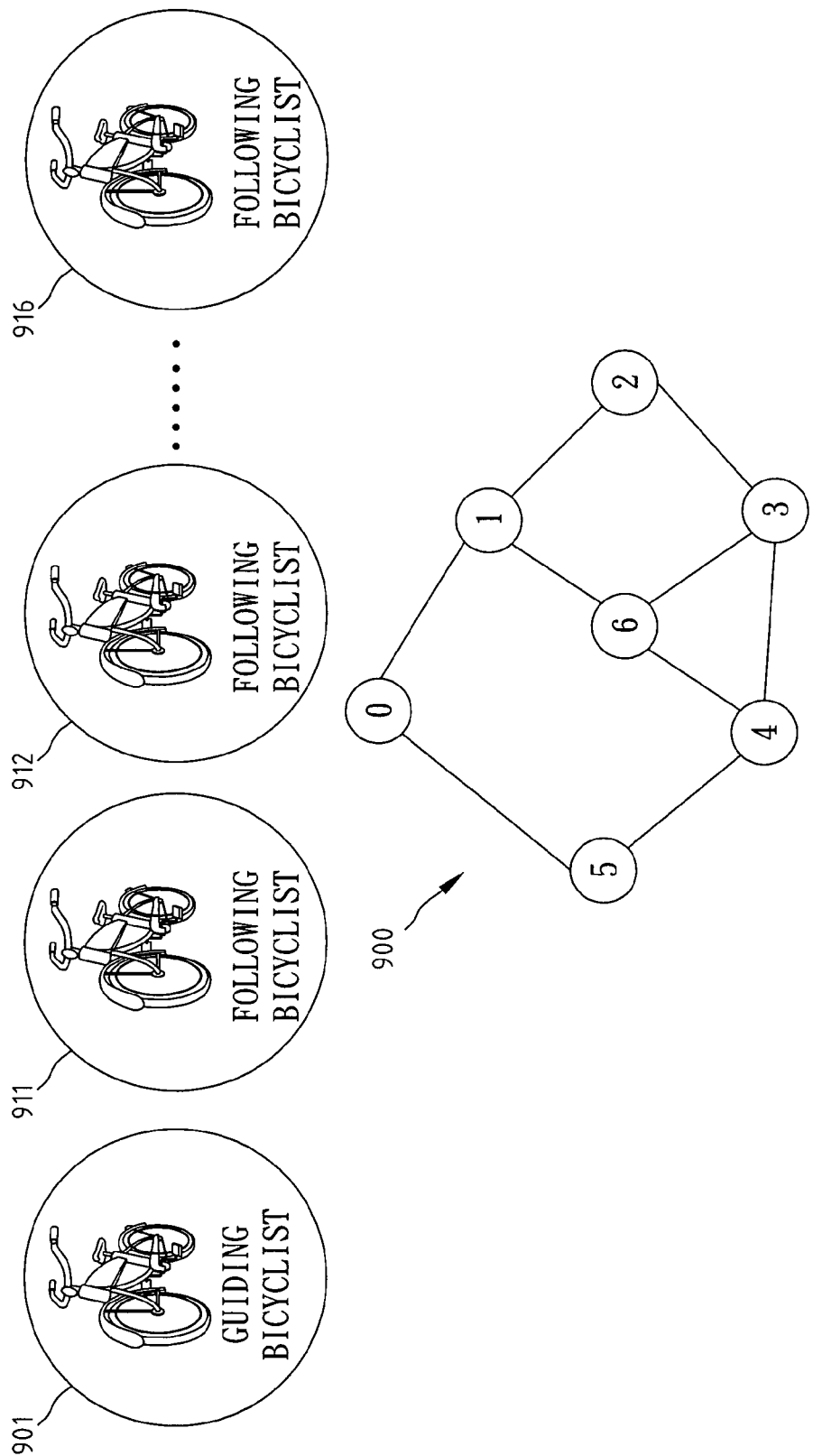
FIG. 9 shows a schematic view illustrating an exemplary group activity and related network topology, consistent with certain disclosed embodiments of the present invention.

The following uses an actual group activity environment as an example to describe the operation steps of the present invention. The group activity is a group's bicycle riding activity, as shown in FIG. 9. The group includes 7 members, a guiding bicyclist 901 and 6 following bicyclists 911-916, forming an independent wireless network through wireless communication devices, shown as network topology 900. As the members are scattered inside the group, no additional external deployment is required, such as GPS satellite, wireless station or wireless sensor network.

The working example uses IEEE 802.15.4 standard, ZigBee wireless communication technology, to realize the communication of the present invention, Jennic ZigBee communication module to implement the network communication protocol, ZigBee network as Mesh network architecture to implement the characteristic that any communication device may be able to connect to at least one communication device in the system, and 7 Jennic ZigBee communication devices to simulate the group's bicycle riding activity. Each Jennic ZigBee communication device includes the modules and elements of wireless communication device 800. The actual operation steps are described as follows.

The communication device carried by guiding bicyclist (i.e., the captain) is activated and selects the master mode. At this point, group management module 840 initializes a network and sets a specific network ID via network management intermediate module 810. In the example, the network ID is set as 0x1234 to establish an independent network and allows the communication devices carried by the following bicyclists (i.e., other members of the group) to join the network. The network address of the master node is set to 0x0, shown as the network ID and the network address of the communication device carried by the master node (guiding bicyclist) of FIG. 10. In FIG. 10, the initial content of the LQI table of outside determination module 820 is set to be empty.

The communication devices carried by the following bicyclists are activated, select client mode and set the network ID of the network to join. At this point, group management module 840 searches the network ID and tries to join the network via network management intermediate module 810. When a client node tries to join the network, the client node obtains a unique address network address 0x1 from the master node through its own parent node, shown as the network ID and the network address of network management intermediate module 810 of the communication device carried by a client node of FIG. 11.

At this point, all the communication devices, including the master node and all the client nodes, have the ZigBee router capability and may route information of other nodes to the target node through ZigBee communication protocol. The client node may join the network through the routers, and the router is the parent node of the client node. In this manner, all the nodes form a Mesh network architecture.

Furthermore, the network management intermediate module 810 of all the nodes are responsible for managing the own established network topology information, including managing routing table and one hop table. The network management intermediate module 810 of the master node is also responsible for allocating the network address. In addition, one hop table stores the network addresses of the parent node and the child node in the initialization stage. At this point, the network management intermediate module 810 of all the nodes update the one hop table and the routing table, shown as the one hop table and the routing table of the network management intermediate module 810 of FIG. 10 and FIG. 11.

All the nodes periodically broadcast a one hop alive packet to all the other nodes through the wireless communication device 800. At this point, the network management intermediate module 810 of all the nodes update the one hop table and the routing table, shown as the one hop table and the routing table of the network management intermediate module 810 of FIG. 12 and FIG. 13.

All the nodes further monitor the broadcasted and still alive packets after one hop via fall behind warning module 830. If a broadcasted and still alive packet is under one hop condition, the still alive packet is received, the network address and corresponding signal strength of the sending node are extracted, and the LQI table of the neighboring node is updated, shown as the LQI table of outside determination module 820 of FIG. 12 and FIG. 13.

All the nodes execute outside determination algorithm and determine the outside nodes of the network topology at this point via outside determination module 820. For example, if node 4 falls behind, all the nodes of the system will determine the falling behind of node 4 through outside determination module 820. The nodes originally connected to node 4 will broadcast the event of node 4 falling behind via fall behind warning module 830. The other nodes of the system receive the message of fall behind of node 4 through wireless communication module 850.

The above example uses the same wireless communication technology, such as, ZigBee short-distance wireless communication technology with power less than 1 mW, i.e., low power. The experimental result shows that Jennic ZigBee communication device has a life span of 120 active hours, suitable for whole-day activity. Also, a single ZigBee wireless communication device has the advantage of low cost.

Figure 14A:
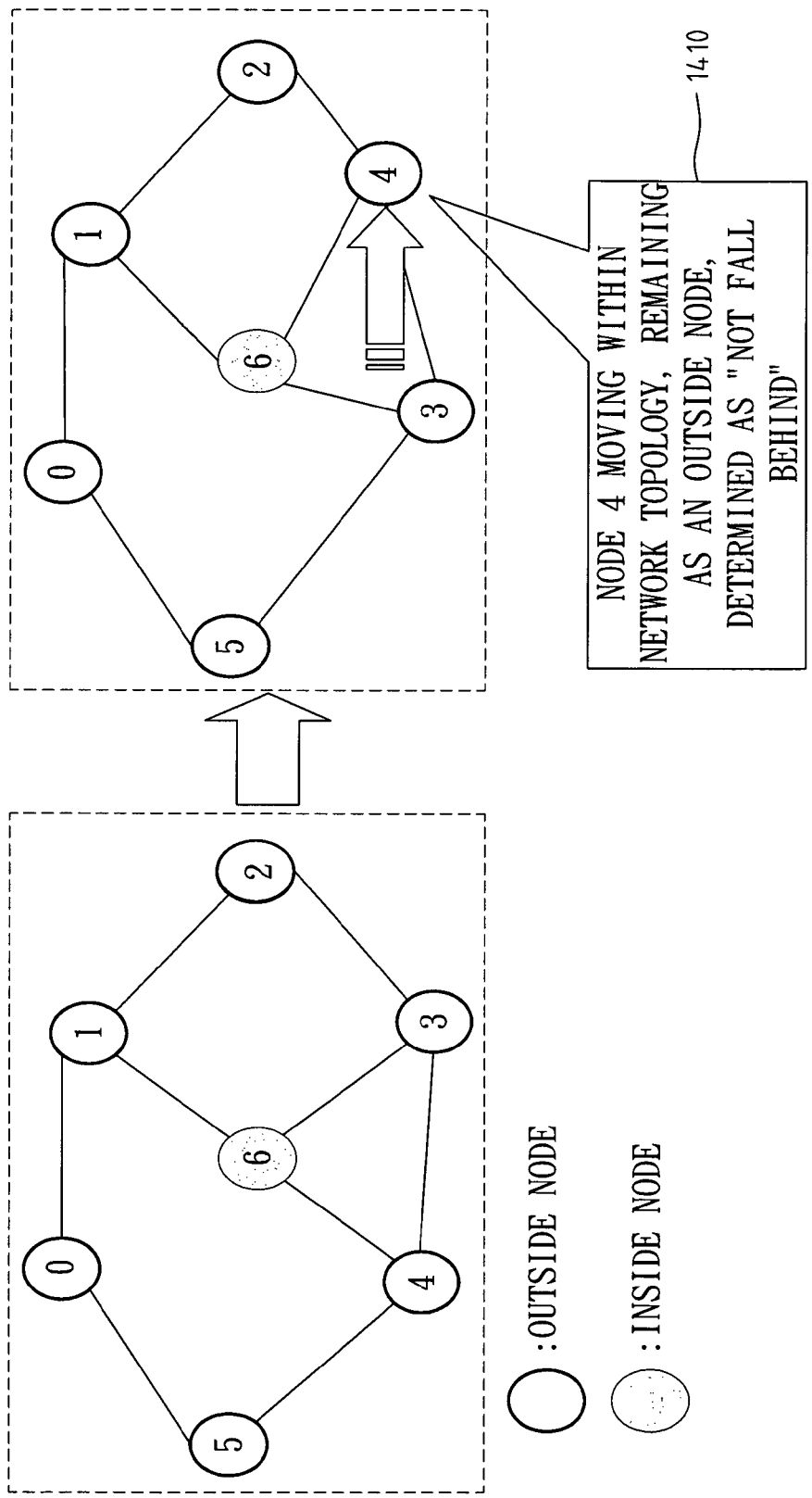
FIGS. 14A-14C show exemplary schematic views of three scenarios of a node moving within the network topology, consistent with certain disclosed embodiments of the present invention.
Figure 14B:
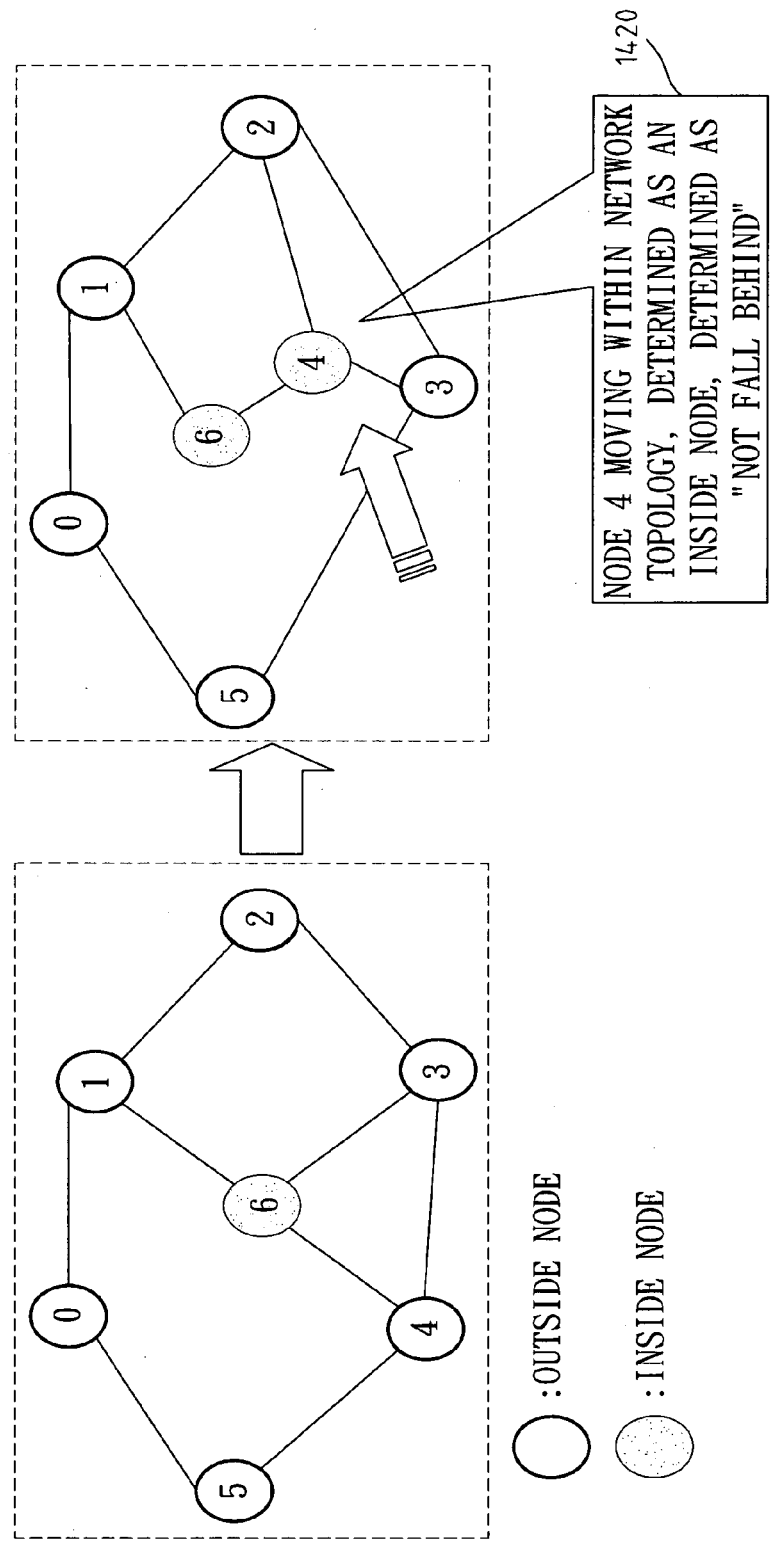
Figure 14C:
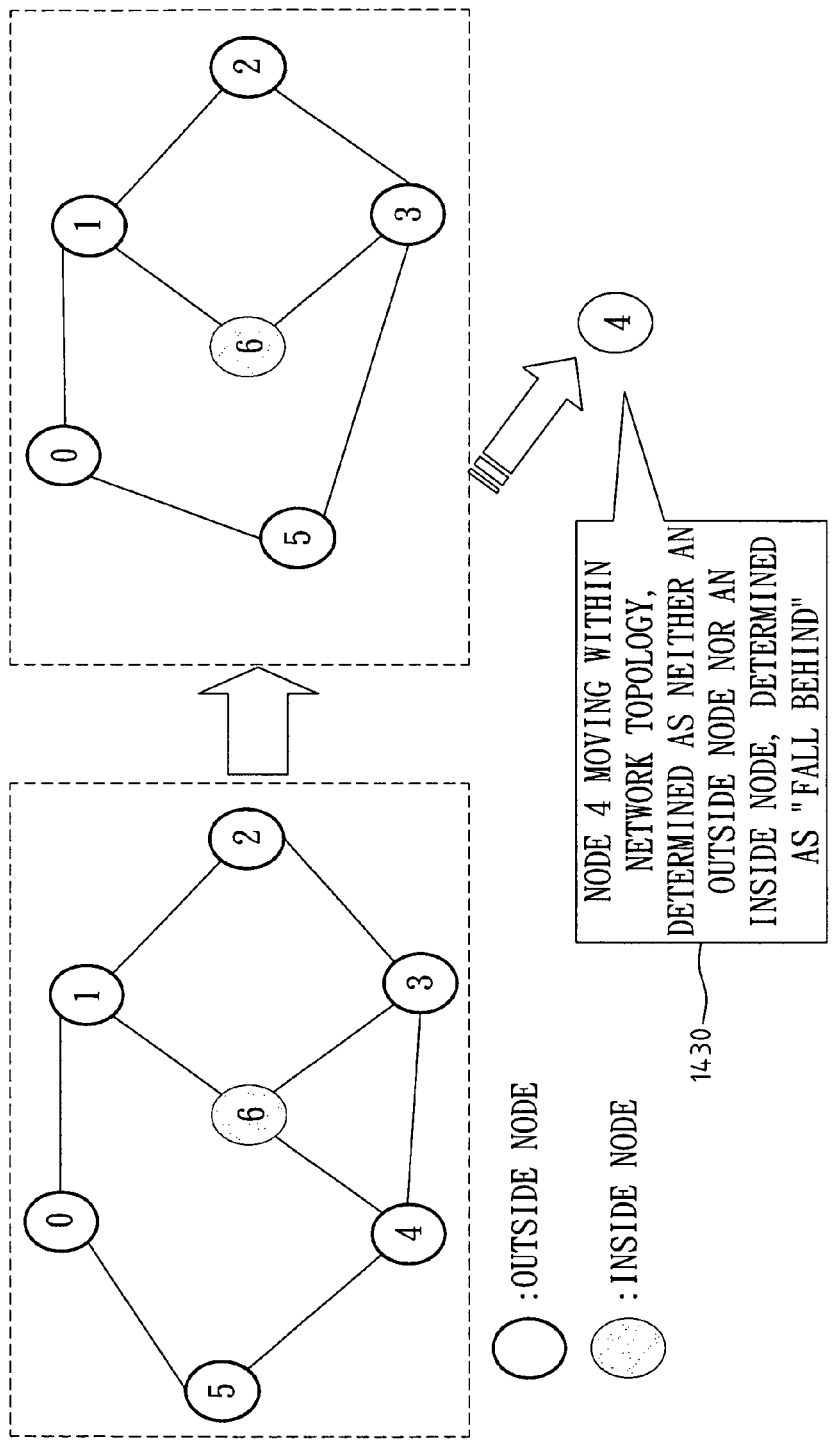

The following three scenarios verify the feasibility and accuracy of the fall behind warning of the present invention. Scenario 1 is as shown in FIG. 14A, where node 4 moves within the network topology and remains as an outside node; thus, determined as "not fall behind", labeled as 1410. Scenario 2 is as shown in FIG. 14B, where, according to the exemplary flowchart of FIG. 5, node 4 moves within the network topology. It is not in the list of outside nodes, but it is determined as an inside node; thus, it is determined as "not fall behind", labeled as 1420. Scenario 3 is as shown in FIG. 14C, where, according to the exemplary flowchart of FIG. 5, node 4 moves within the network topology and is neither an outside node nor an inside node; thus, determined as "fall behind", labeled as 1430. From the above three scenarios, the feasibility and accuracy of the present invention are verified.

In summary, the present invention may provide an automatic fall behind warning method and system, applicable to group activity environment. Without the additional deployment of equipments in an external environment to obtain the relative position of two nodes, the disclosed embodiments of the present invention may achieve the advantages of automatic fall behind warning, and it is less restricted by the geographical and climatic factors. The communication device of the disclosed embodiments of the present invention may use one kind of single wireless communication technology with inexpensive device cost and low power consumption features, suitable for whole-day activity. Because of the cost effective implementation, the disclosed embodiments of the present invention may be used to automatically warn of the fall behind event so as to reduce the accident and the delay of rescue event.

Although the present invention has been described with reference to the exemplary embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. An automatic fall behind warning method applicable to a group activity environment, comprising the steps of:
   (a) forming a network with a plurality of nodes each corresponding to a communication device carried by an individual participated in a group activity;
   (b) initializing an outside node table consisting of all outside nodes determined by an outside determination algorithm according to initial topology of said network;
   (c) obtaining a link quality index (LQI) table of said network, said LQI table having a plurality of connection entries with each connection entry specifying a connection between two nodes that are able to communicate and signal strength of the connection;
   (d) generating a list specifying current inside nodes and current outside nodes determined by said outside determination algorithm according to current topology of said network;
   (e) comparing the outside nodes in said outside node table with said current outside nodes specified in the generated list of step (d);
   (f) if there is an outside node in said outside table disappears from said current outside nodes of step (d), proceeding to step (g); otherwise, updating said outside node table with said current outside nodes of step (d) and returning to step (c);
   (g) checking whether the disappearing outside node becomes one of said current inside nodes of step (d); and
   (h) if the disappearing outside node is one of said current inside nodes of step (d), updating said outside node table with said current outside nodes of step (d) and returning to step (c); otherwise, declaring that the disappearing outside node is falling behind and issuing a warning;
   wherein said outside determination algorithm determines each node in the topology of said network as being either an inside node or an outside node with the outside node being a node located in an outskirt part of said group activity according to the topology of said network.

2. The method as claimed in claim 1, wherein said outside determination algorithm comprises the steps of:
   (s1) connecting the nodes in the topology of said network according to the connections specified in the connection entries of said LQI table one by one by following the signal strength of the connections from the strongest to the weakest until at least a loop is formed by the nodes;
   (s2) checking if there are any two loops formed with an overlapped path in step (s1);
   (s3) for each overlapped path found in step (s2) if the overlapped path has one or more nodes in addition to a starting node and an ending node of the overlapped path, labeling each of the one or more additional nodes as an inside node;
   (s4) returning to step (s1) if there are still nodes not connected according to the connection entries of said LQI table; otherwise, proceeding to step (s5);
   (s5) labeling each of the nodes that have not been labeled as an inside node as an outside node.

3. The method as claimed in claim 1, wherein in said group activity environment any communication device carried by an individual participated in the group activity is able to communicate with at least another communication device carried by another individual participated in the group activity except for a communication device whose corresponding node is falling behind.

4. The method as claimed in claim 1, wherein at least two individuals participated in the group activity.

5. The method as claimed in claim 1, wherein all nodes form said network through a common communication protocol.

6. The method as claimed in claim 1, wherein said method does not use relative position information of nodes in said network.

7. An automatic fall behind warning system applicable to a group activity environment, comprising a plurality of wireless communication devices each being carried by an individual participated in a group activity and corresponding to a node and a network formed by all the nodes, each wireless communication device comprising:
   a network management intermediate module for managing network related information of each node;
   an outside determination module for monitoring signal strength of neighboring nodes of each node and generating a list of inside nodes and outside nodes according to topology of the network;
   a fall behind warning module for comparing the outside nodes saved in an outside node table with current outside nodes determined in current topology of the network to check whether any outside node in the outside node table disappears from the current outside nodes, automatically sending a fall behind warning if there is a disappearing outside node from the outside node table which has not become one of current inside nodes determined in the current topology of the network, and updating the outside node table with the current outside nodes;
   a group management module for activating the network management intermediate module and managing network setting of each node; and
   a wireless communication module for activating a wireless network to perform wireless communication among the nodes;
   wherein each node in the topology of the network is determined by the outside determination module as being either an inside node or an outside node with the outside node being a node located in an outskirt part of the group activity according to the topology of the network.

8. The system as claimed in claim 7, wherein said outside determination module further comprises an link quality index (LQI) table of said network, said LQI table having a plurality of connection entries with each connection entry specifying a connection between two nodes that are able to communicate and signal strength of the connection.

9. The system as claimed in claim 8, wherein said outside determination module implements an outside determination algorithm comprising the steps of:
- (s1) connecting the nodes in the topology of said network according to the connections specified in the connection entries of said LQI table one by one by following the signal strength of the connections from the strongest to the weakest until at least a loop is formed by the nodes;
- (s2) checking if there are any two loops formed with an overlapped path in step (s1);
- (s3) for each overlapped path found in step (s2) if the overlapped path has one or more nodes in addition to a starting node and an ending node of the overlapped path, labeling each of the one or more additional nodes as an inside node;
- (s4) returning to step (s1) if there are still nodes not connected according to the connection entries of said LQI table; otherwise, proceeding to step (s5);
- (s5) labeling each of the nodes that have not been labeled as an inside node as an outside node.

10. The system as claimed in claim 7, wherein in said group activity environment any wireless communication device carried by an individual participated in said group activity is able to communicate with at least a wireless communication device carried by another individual participated in said group activity except for a wireless communication device whose corresponding node is falling behind, and wireless communication signal is used for network topology determination and message transmission.

11. The system as claimed in claim 7, said system implements each of said plurality of wireless communication devices via a same type of wireless communication device.

12. The system as claimed in claim 7, wherein said network management intermediate module initializes network information, allocates network address information, and updates information of neighboring nodes of each node, and routing information of communication protocol.

13. The system as claimed in claim 12, wherein said network management intermediate module further includes:
- a one hop table for recording information of neighboring nodes of each node;
- a routing table for recording routing information of said communication protocol; and
- two fields for recording a specific network ID and an allocated network address of the node.

14. The system as claimed in claim 7, wherein each wireless communication device further includes a low power monitoring module for monitoring power and issuing a warning when the power is lower than a threshold.

15. The system as claimed in claim 7, wherein said group includes at least two individuals.

16. The system as claimed in claim 7, wherein said system describes the topology of said network with wireless signal coverage ranges of said wireless communication devices carried by individuals participated in said group activity.

17. The system as claimed in claim 7, wherein said system does not require equipment deployment in an external environment.

18. The system as claimed in claim 7, wherein said system does not deploy any equipment from the group consisting of GPS satellite, wireless base station and wireless sensor network.

* * * * *